United States Patent [19]
Cornette et al.

[11] 4,086,695
[45] May 2, 1978

[54] METHODS FOR THE IN-SITU CASTING OF INTER-CELL CONNECTORS

[75] Inventors: Earl B. Cornette, Brandon; Laurence W. Hahn, Tampa, both of Fla.

[73] Assignee: Chloride Connrex Corporation, Tampa, Fla.

[21] Appl. No.: 505,467

[22] Filed: Sep. 12, 1974

[51] Int. Cl.² ............................................. H01M 2/24
[52] U.S. Cl. .................................. 29/623.1; 429/160; 164/DIG. 1
[58] Field of Search ............................. 136/134, 176; 164/DIG. 1; 429/160; 29/623.1

[56] References Cited

U.S. PATENT DOCUMENTS

| | | | |
|---|---|---|---|
| 2,942,059 | 6/1960 | Doyle et al. | 136/176 |
| 3,703,589 | 11/1972 | Rigsby | 136/134 R |
| 3,764,393 | 10/1973 | Fujimoto | 136/176 |
| 3,988,169 | 10/1976 | McLean | 29/623.1 |

*Primary Examiner*—Donald L. Walton

*Attorney, Agent, or Firm*—Watson, Cole, Grindle & Watson

[57] ABSTRACT

A method of assembling an electrical battery in which the container is used as part of the jig fixture wherein apertures are formed in the partitions separating the cells of the battery container. The plate groups are placed into each cell and a channel is formed adjacent the plates of like polarity in each plate group such that a part of each plate of like polarity is exposed in its respective channel. Molten metal is caused to flow only in the channels with the battery container in an upright position such that the molten metal flows through the apertures in the partitions to form inter-cell connectors between the respective battery cells and also to join the parts of like polarity in each cell. Compressive pressure is applied to the bus bars on opposing sides of the inter-cell connector to cause an expansion thereof and form a permanent seal where the inter-cell connector passes through each of the apertures in the battery cell partitions.

10 Claims, 13 Drawing Figures

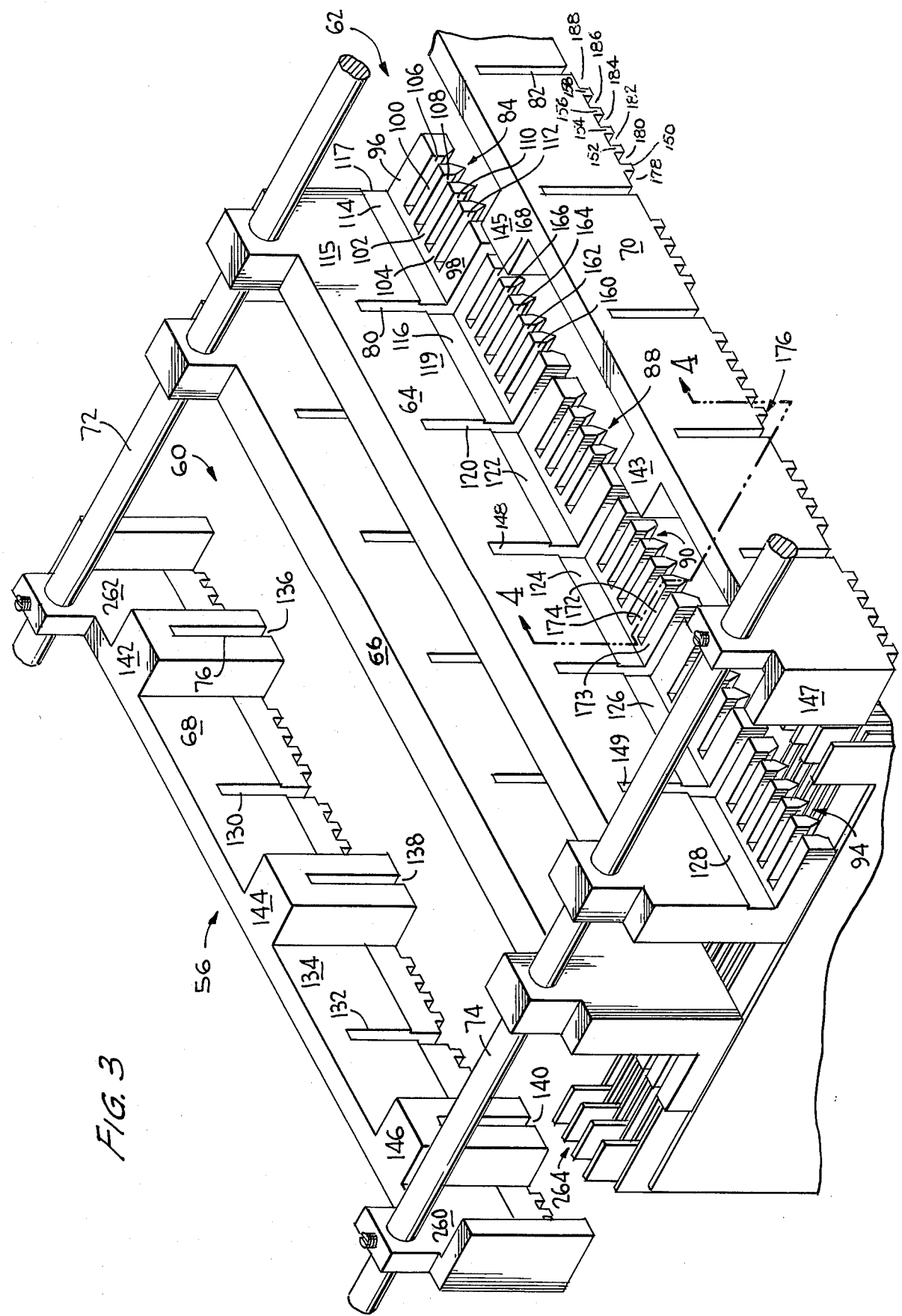

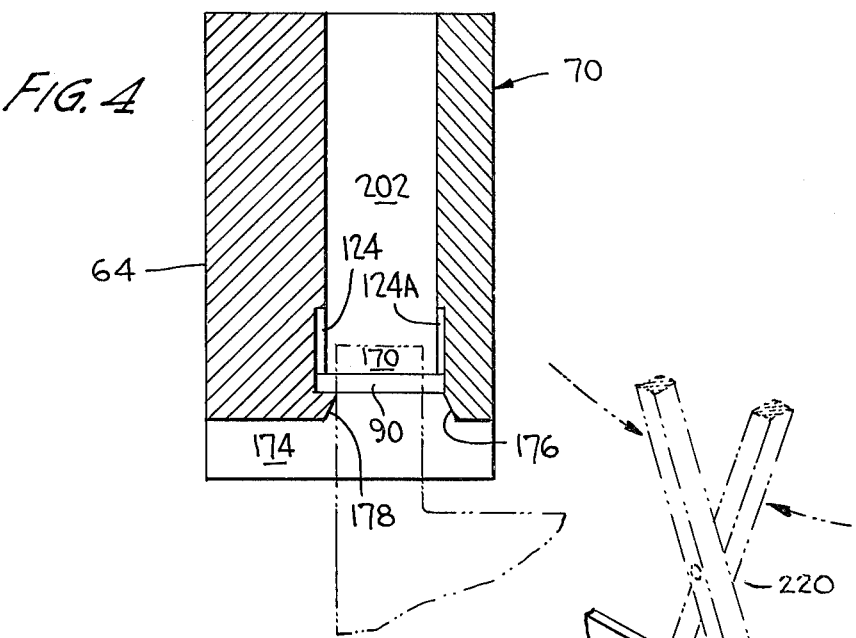
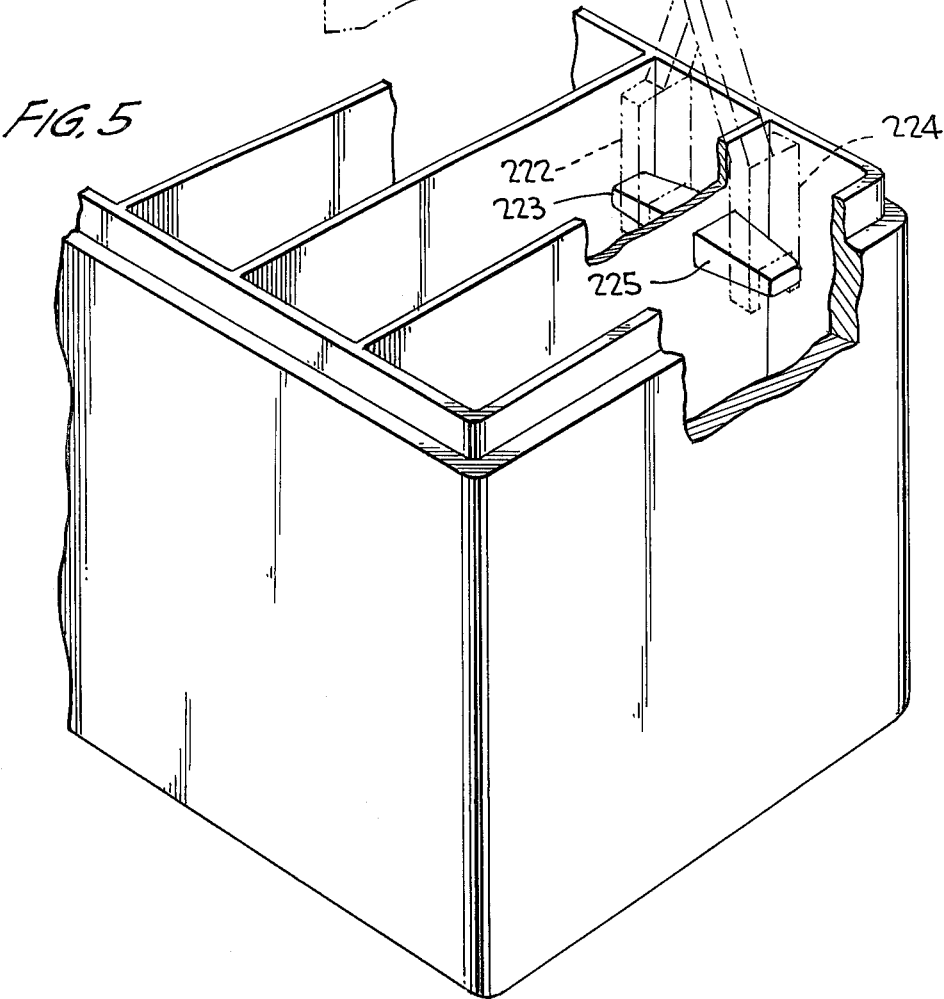

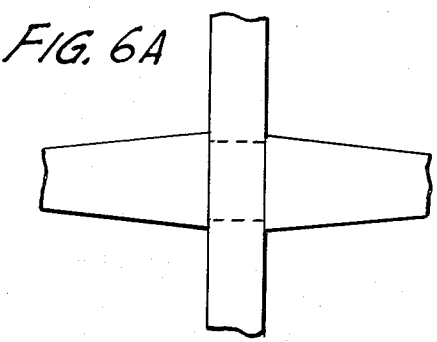
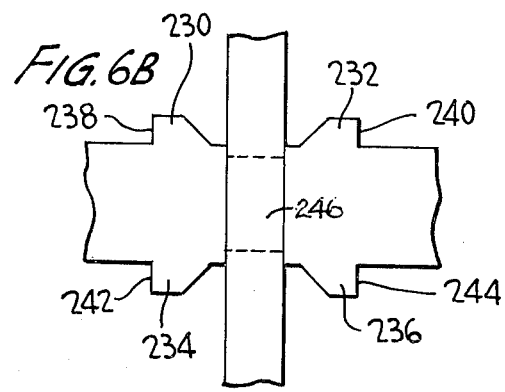
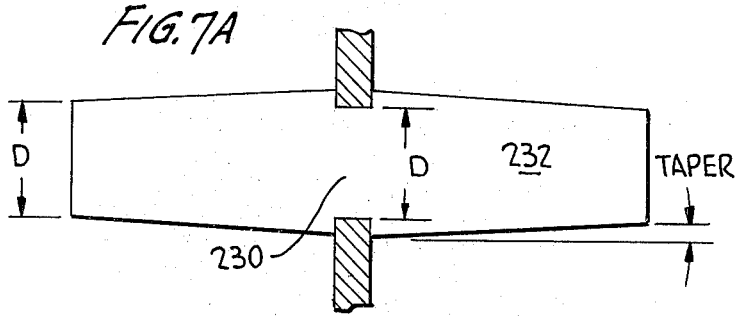
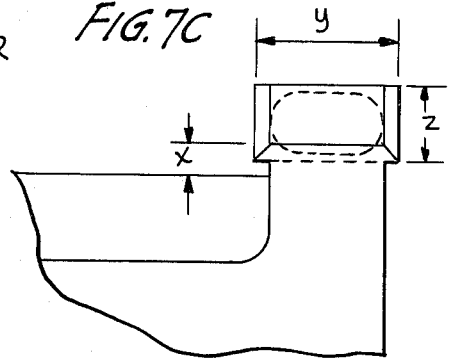
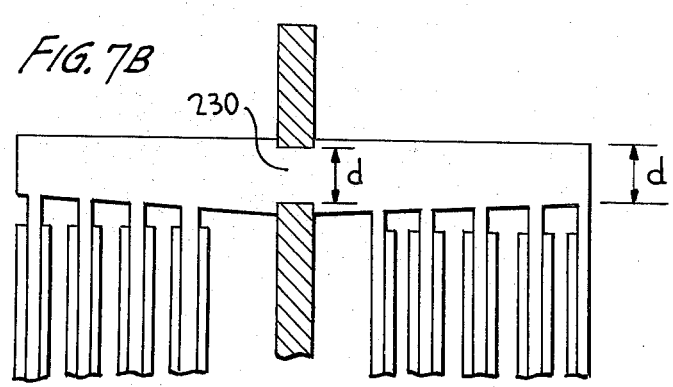
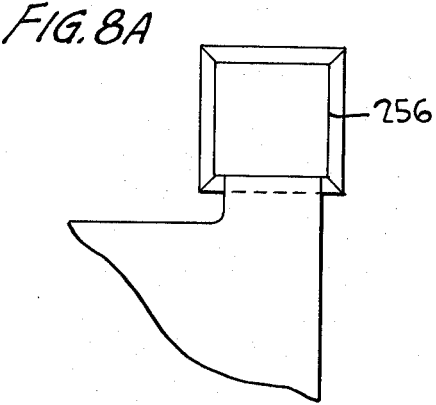
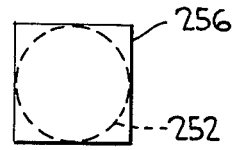
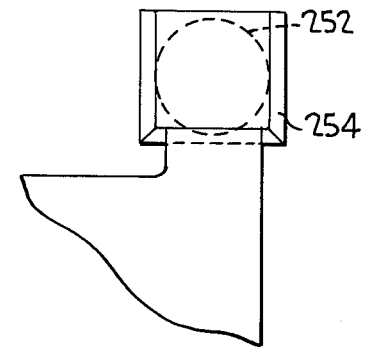

METHODS FOR THE IN-SITU CASTING OF INTER-CELL CONNECTORS

The present invention relates to processes, and fixtures for carrying out such processes, for the in-situ formation of inter-cell connectors and bus bars for electrically coupling plates of like polarity in multi-cell batteries of the type comprising a polarity of side-by-side alternative positive and negative plates; and to the structure formed by such processes.

In conventional manufacture and assembly of batteries of the type having a number of cells each housing a group of plates, each group of plates is first built-up externally of the battery container by interleaving alternate positive and negative plates with separators therebetween. Each plate is provided with an integral lug to facilitate interconnection of like polarity plates. The groups of interleaved plates are placed in, and held by, what is known in the art as, a "group burning machine". Such machines include tooling to hold in alignment the groups of spaced plates and to form a trough adjacent the plates of like polarity in each group. The troughs are adapted, and the plate lugs are positioned, so that the lugs extend into the troughs for interconnection. Where inter-cell or terminal connections are required, preformed inter-cell or terminal connectors are positioned adjacent to the groups as required with a toed portion thereof extending into the appropriate trough or troughs.

The plates of like polarity and connectors in each group are then interconnected by application of heat to melt a portion of the plate lugs and connectors, which protrude into the troughs, and by supplying additional molten lead into the troughs to form a bus bar in each trough.

Accordingly the lead bus bars connect like polarity plates together in each group in addition to providing anchoring for take-off connectors, for example an inter-cell connector or terminal posts.

On solidification of the bus bars formed in a conventional group burning machine, the tooling forming the troughs is removed and the groups of connected plates are then withdrawn from the machine and subsequently placed into their respective cells in a container of polypropylene, rubber or any other suitable material. Adjacent inter-cell connectors are then resistance welded together through a hole previously formed in the container dividing partitions.

Problems have been experienced with premature failure of the battery elements, which have been fabricated by the abovementioned conventional manufacturing process, and in particular failure of the resistance welded inter-cell connectors. Further, the handling of the groups of interconnected plates from the group burning machines and their assembly into the container cells is undesirable and can contribute to such failures during normal use. Also such processes are costly and time consuming.

An object of the present invention is to provide improved methods of manufacturing and assemblying inter-cell connectors and bus bars for electrical batteries.

Another object of the present invention is to provide improved sealing between the cells of batteries of the type wherein the inter-cell connectors pass thru the partions separating the battery cells.

A further object of the present invention is to provide improved tooling fixtures for carrying out processes for the in-situ formation of inter-cell connectors and bus bars in batteries of the type specified herein.

And yet another object of the present invention is to provide improved battery structures of the type specified herein.

SUMMARY OF THE INVENTION

According to the present invention the battery container itself is used as a fixture for retaining the plates and separators in carrying out the process of the in-situ formation of the inter-cell connectors. A container guide fixture for aligning and supporting a removable trough or channel forming fixture, in which the inter-cell connectors and bus bars are formed, is mounted over the edges of the battery container and includes a number of parallely spaced guide members which are equal in number to the number of partitions within the battery and each of which is aligned directly above a respective partition. The partitions each include apertures for interconnecting respective alternate groupings of positive and negative plates. The channel forming fixture includes a pair of mold fixtures, each comprising a movable comb fixture and a fixed back-dam mounted on a pair of spaced guide members such that each mold fixture is mounted on opposite lateral sides of the battery container to form the necessary troughs or channels for respectively forming the inter-cell connectors and bus bars for connecting the positive and negative plates. Each of the movable comb fixtures includes a number of comb groups, equal in number to the cells of the battery, and each comb group includes a number of spaced fingers between which are received the plate lugs from the plates within each cell of the battery container. The respective mold fixtures are aligned and supported by the container guide fixture such that the plate lugs are positioned within the comb fingers when the channel forming fixture is placed onto the container guide fixture.

Each of the plate lug slots formed within each of the respective mold fixtures includes slanted end and side faces to aid in guiding the plate lugs into the respective plate lug slots when the channel forming fixture is placed upon the battery container such that the plate lugs extend above the upper surface of the comb structure to be melted by the molten alloy as it flows along the channels formed between the respective movable comb and back-dam fixtures. Each respective movable comb fixture and its associated back-dam fixture are located in operative association to form the necessary channels for the inter-cell connectors and bus bars and do not require re-poisitioning for the proper engagement of the plate lugs. However, if necessary, the methods may include a pre-alignment of the plates and separators within the battery container prior to placement of the channel forming fixture onto the battery container. The molten metal may be then poured into each of the channels such that the molten metal flows through a respective partition aperture of an inter-cell grouping to form an inter-cell connector therebetween. Alternatively, the molten metal may be formed within the channels by well known welding techniques. On solidification of the metal, the removable comb fixture associated with each of the mold fixtures is slid away from its respective back-dam fixture along the guide members, and the entire channel forming fixture and the container guide fixture are then removed from the battery container. A further sealing of the partitions and the inter-cell connectors may be obtained by the application of opposing compressive pressure on the inter-cell connectors to at least swell or expand the inter-cell connectors within the partition apertures.

The aforedescribed assembly method eliminates the conventional "burning up" of a group of plates in the group burning machines as a separate operation, anchoring the inter-cell connectors, and welding together of such conventional inter-cell connectors. There is a consequent reduction in the number of handling steps required to form the inter-cell connectors, which in turn results in a lower reject rate, increased production rate, and an overall economy in the production of the inter-cell connection.

The process of the invention may be utilized when battery containers of both hard rubber and thermoplastic material such as polypropylene are used. However, it is desirable to provide a more rigid connection with the partitions through which the inter-cell connectors are formed to eliminate leakage of electrolyte between cells, thereby preventing undesirable voltage reduction of the battery cells, and to strengthen the inter-cell connectors against vibration, especially under rugged duty service conditions. Therefore, the inter-cell connectors on each side of the aperture adjacent a partition are provided with a taper or flanges such that opposing axial compressive forces, resulting from swaging, may be applied to the inter-cell connectors to achieve both a swelling of the metal within the aperture as well as a gripping engagement of the inter-cell connectors with the respective surfaces surrounding the partition. This is achieved by making the cross section of the inter-cell connector within the aperture less than the cross section of the bus bar adjacent both sides of the partition such that the application of the swaging force causes the requisite swelling of the alloy within the aperture. Additionally, the swaging pressure causes compressive engagement of the opposing lateral surfaces of the inter-cell connector with the opposite surfaces of the partitions and causes a slight deformation of thoses surfaces. More effective sealing is caused by the expansion of the inter-cell connector within the partition wall aperture and the deformation of the surface area surrounding the partition wall aperture comprises a secondary, or back-up sealing. However, expansion of the inter-cell connection within the aperture is preferred as to only the crimping of the partition by both inter-cell connectors on opposite sides of the partition. It is also to be understood that the purpose of the application of the swaging force in the process of the present invention is to obtain both of the aforementioned expansion and crimping. Therefore, the process of the present invention preferably includes application of the necessary opposing compressing force (swaging) by engagement of the lateral surfaces of the inter-cell connectors on both sides of the partition wall and the swaging force is preferably applied successively to each of the inter-cell connections when the molten lead has cooled to approximately ambient temperature and subsequent to removal of the aforementioned channel forming fixture from the upper edge surfaces of the battery container. Such successive treatment of the inter-cell connection simplifies the tooling fixture to apply the swaging pressure; however, the swaging pressure may be applied to two or more inter-cell connections simultaneously.

BRIEF DESCRIPTION OF THE FIGURES

FIG. 3 is a perspective view of the channel forming fixture showing the pair of channel mold fixtures each with their respective movable comb and back-dam in non-operative relationship to more clearly illustrate the structural features thereof;

FIG. 4 is a cross section view taken along lines 4 — 4 in the direction illustrated in FIG. 3 showing the removable comb and back-dam in operative relationship to form a channel therebetween and illustrating the approximate positioning of a plate lug within the channel;

FIG. 5 illustrates an exemplary embodiment of a crimping or swaging tool fixture in operative relationship with an inter-cell connection for the purpose of applying a simultaneous opposing force thereto;

FIG. 6A illustrates a preferred tapered shape of the inter-cell connector on opposing adjacent sides of an aperture within a partition to aid the application of the swaging force, and FIG. 6B illustrates an alternative embodiment of a connector shape for the same purpose;

FIG. 7A, 7B are respective top and side cross sectional views of the preferred form of the inter-cell connector shown in FIG. 6A showing the relationship of the inter-cell connection with the aperture; and FIG. 7C is taken in the direction of the arrow shown in FIG. 7B and further illustrates the relationship of the flange on the inter-cell connector, the aperture within the partition and the plate lug which has been cast to the connector; and FIG. 8A and 8B are respective views similar to FIG. 7C showing alternative forms of the inter-cell connector and the relationship of the flange on the inter-connector, the aperture within the partition and the plate lug; and FIG. 8C illustrates the relative proportions of the apertures shown in FIGS. 8A and 8B.

DETAILED DESCRIPTION OF THE INVENTION

Figure 1:
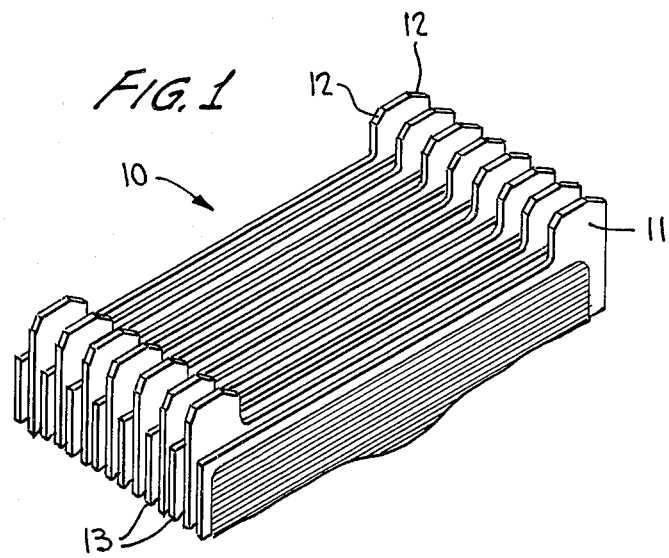
FIG. 1 illustrates a number of battery plates assembled for insertion within a cell cavity in the battery container.

In FIG. 1 a number of group 10 of interleaved alternate positive and negative rectangular plates are aligned in spaced relationship and are provided with separators 13 therebetween. Each plate includes an upwardly extending lug 11 which is integrally formed therewith and located at a top corner of the rectangular plate. Lugs 11 of like polarity plates are aligned in a suitable manner for interconnection as will be more clear from the following description. Plate lugs 11 include mitred corners 12 as shown in FIG. 1 which may be provided as an aid in aligning the plate lugs within the slots of the comb groups on the movable comb fixtures. The interleaved plates within group 10 are then inserted into battery container 14 (FIG. 2) having a number of cells 16 to 26 which are separated by partition walls 28 to 36 and wherein each cell contains at least one group of plates 10. The number of cells illustrated in FIG. 2 is only exemplary and the invention described herein may be performed with any number of battery cells.

In the present invention battery container 14 forms a jig into which the individual plate groups 10 are inserted prior to inter-connection. Container 14 may provide the means for maintaining the plates in aligned relationship within the battery to achieve a course alignment of the plate lugs 11 (for reasons that will become apparent from the following description) by making one lateral wall of container 14 of heavier construction. Alternatively, an appropriate shim may be inserted along one lateral edge of each cell 16 to 26. Subsequent to the placing of the plate groups 10 into each cell, battery container 14 may be rotated such that the battery plates 10 are caused to lie against the shim or that lateral side of the battery with the increased thickness.

Figure 2:
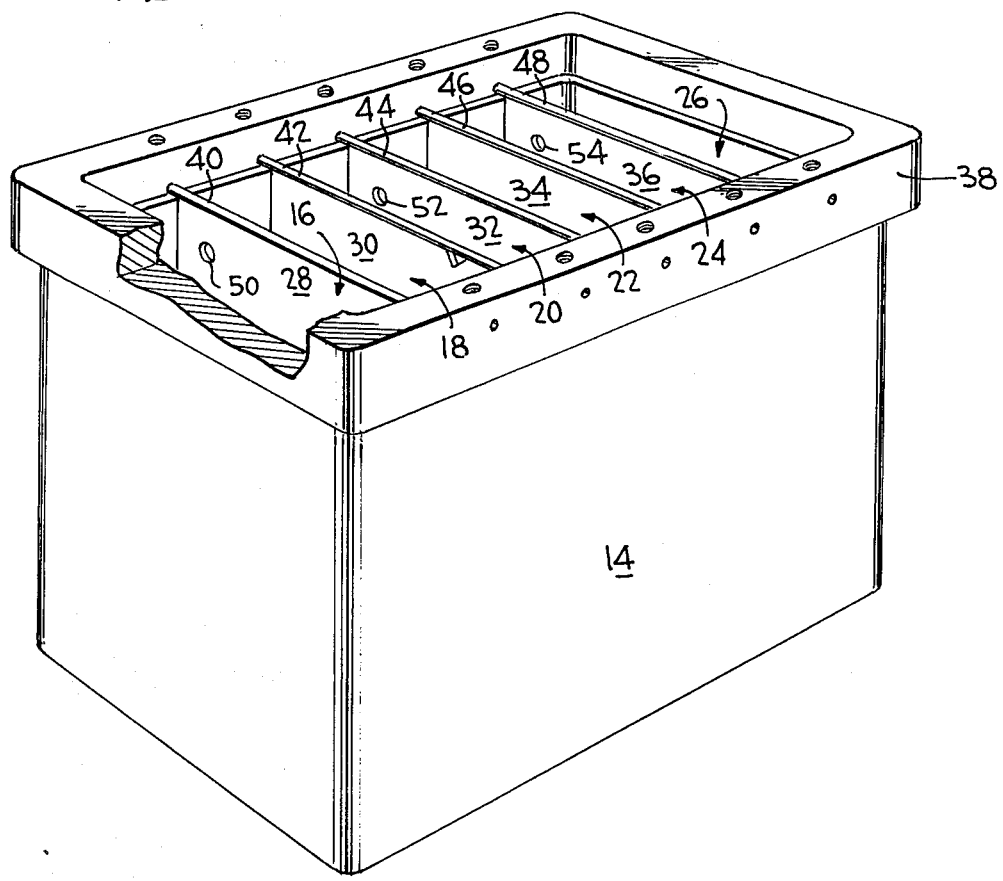
FIG. 2 represents an exemplary embodiment of a container fixture guide for supporting and aligning a channel forming fixture with the battery cell partitions.

Continuing with FIG. 2, container fixture guide 38 is shown in operative relationship over the upper edge portions of battery container 14 and includes guide rods 40 to 48 which extend laterally across the battery container and are in respective vertical alignment above partitions 28 to 36. Apertures 50, 52, 54 are shown formed in partitions 28, 32 and 36, respectively, and partitions 30, 34 include similar apertures (not illustrated) formed therein on the opposite side of battery container 14 than apertures 50, 52, 54 such that the appropriate inter-cell connections can be established.

The channel forming fixture 56 illustrated in FIG. 3 may be mounted to container fixture guide 38 (previously described with respect to FIG. 2) to form a unitary structure therewith, or both fixtures may be separated structures. The channel forming fixture and container fixture guide 38 have not been illustrated in operative mounted relationship in order to preserve the clarity of illustration in FIGS. 2 and 3. From the description it will be apparent to those skilled in the art that container fixture guide 38 and channel forming fixture 56 can be mounted in operative relationship such that the inter-cell connection can be formed through the apertures in the partitions as desired.

Channel forming fixture 56 comprises two parallely spaced mold fixtures 60, 62, each including movable comb 66 and stationary back-dam 68 and movable comb 64 and stationary back-dam 70, respectively. Movable combs 64, 66 are mounted in sliding arragement on parallely spaced support rods 72, 74 and back-dams 68, 70 are mounted in fixed position to the same support rods by set screws as illustrated in FIG. 3. It is noted that the movable combs 64, 66 are not illustrated in operative relationship with their respective back-dams 70, 68 to provide the channels for forming the inter-cell connectors. The movable combs and back-dams are shown in separated relationship for the purpose of clearly illustrating the pertinent structure of those compounds. The maximum spacing between fixed back-dams 68 and 70 is, of course, determined by the width of battery container 14 and the spacing between the back-dams may be adjusted to provide the channels in alignment with the location of plate lugs 11 within the battery container 14.

The following description is taken with respect to movable comb 64 and fixed back-dams 68, 70 for the purpose of describing their pertinent structures. Movable combs 64, 66 are identical to each other and back-dams 68, 70 are identical to each other. Partition slots 76, 78, 80 and 82 are in aligned relationship so that the aforesaid slot will mount over partition 36 illustrated in FIG. 2 and the upper surface thereof will rest upon guide bar 48. In a similar manner, the other partition slots illustrated in FIG. 3 are in the same aligned relationship such that the respective rows of aligned partition slots will mount over respective partitions within battery container 14.

Movable comb 64 includes six sets of identical comb groups 84, 86, 88, 90, 92 and 94. For example, comb group 84 includes end fingers 96, 98 and intermediate fingers 100, 102, 104 thereby forming plate lug slots 106, 108, 110 and 112. The width of the plate lug slots is, of course, dependent upon the width of the plate lugs which are to be received within the plate lug slots, and must have tolerances such that the bottom surface formed by the fingers and the inserted plate lugs is not broken. Such tolerances are well known to those skilled in the battery making art. The inside surfaces of end fingers 96, 98 are chamfered and the opposing side surfaces of each of intermediate fingers 100, 102 and 104 are also chamfered for the purpose of guiding the plate lugs into their respective plate lug slots when channel forming fixture 56 is mounted over the battery container.

Continuing with the description of movable comb 64, channel 114 is tapered inwardly of surface 115 from outer edge 117 to partition slot 80. In a similar manner, channel 116 is tapered inwardly of surface 119 from partition slot 120 to the partition slot 80. The remaining channels, namely channels 122, 124 and channels 126, 128 are formed in a manner similar to that described above such that a channel taper is formed adjacent each of partition slots 148 and 149. The channels may also be modified to have a flange formed adjacent the partition slots. The purpose of the "shaped" channel will be apparent from the following description.

Back-dam 68 includes partition slots 130, 132 formed in surface 134 thereof, and partitions 136, 138 and 140 formed respectively in dams 142, 144 and 146. The purpose of dams 142 to 146 is to provide blockage within the channel formed by a respective back-dam and movable comb and thereby prevent passage of the molten lead within the channel. Thus, in the structure thus far described an inter-cell connector would be formed within the channels provided by movable comb 66 and back-dam 68 at partition slots 130, 132 thereof and also in the channels provided by movable comb 64 and back-dam 70 at partition 80, 148 and 149 thereof. Each of back-dams 68, 70 includes feet which are positioned to be received within the plate lug slots between the fingers of a comb group of a respective movable comb with which the back-dam is associated. Thus, for example, with respect to FIG. 3, feet 150 to 158 respectively are received within apertures 160 to 168 of comb group 86 when movable comb 64 is brought into operative relationship with back-dam 70. The operative positional relationship of a movable comb with a back-dam is illustrated in FIG. 4. Plate lug 170 is shown extending upwardly within plate lug slot 172 between fingers 173 and 174 (FIG. 3). Referring to FIG. 4, foot 176 of back-dam 70 and the inner surface 178 of movable comb are chamfered to provide further alignment and ease of entry of plate lug 170 in plate lug slot 172. Oppositely disposed channels 124 and 124A are respectively formed in movable comb 64 and back-dam 70 as described above. Thus, as shown in FIG. 3, when movable comb 64 and back-dam 70 are in operative relationship surfaces 178, 180, 182, 184, 186 and 188 respectively rest upon fingers 190, 192, 194, 196, 198 and 200 of comb group 86. From the above description it is readily apparent that channel 202 (FIG. 4) is formed between movable comb 64 and back-dam 70 when those two fixtures are in operative relationship. Further, it is also clear from the foregoing description and FIGS. 3 and 4 that the bottom surface of channel 202 is formed by the respective upper surfaces of the fingers of combs 84 to 94 and that a seal is formed at the bottom of channel 202 by upwardly extending plate lugs through the respective plate lug slots between the comb fingers. When channel forming fixture 56 is placed over the container fixture guide 38 (illustrated in FIG. 2), movable comb 66 is closed in operative association with back-dam fixture 68, movable comb 64 is closed in operative association with back-dam 70 and support rods 40, 42, 44, 46 and 48 of the container fixture guide 38 are aligned within the respective partition slots of the back-dam and movable comb fixtures. The upwardly extending plate lugs of the plates within the respective cells of battery container 14 project through the plate lug slots in each of movable combs 64 and 66 by the downward movement of channel forming fixture 56 and channel guide fixture 38 so that each of the plate lugs extends above the upper surface of each channel as illustrated in FIG. 4.

The molten lead alloy, which is either poured or deposited within the channels by known welding techniques flows between the dams formed in each of the channels and through the partition aperture between the aforesaid dam structure to form a cast bus bar therebetween and an inter-cell connector through partition aperture.

With respect to the embodiment herein described, an inter-cell connection is formed through apertures 50, 52, 54 and the apertures within partitions 30 and 34 (FIG. 2). With respect to FIG. 3, a cast bus bar is formed between: dams 142 and 144, dams 144 and 146, dams 143 and 145, dam 143 and front end 147 of backdam 70, and dam 145 and the rear end (not shown) of back-dam 70.

In connection with the formation of the inter-cell connections and the bus bars, it is noted that channel forming fixture 56 must be rotated 180 degress from its position shown in FIG. 3 before being placed onto container fixture guide 38 as shown in FIG. 2.

The molten lead alloy is allowed to cool approximately to ambient temperature and during that time channel forming fixture 56 and container fixture guide 38 are removed from their operative association with battery container 14. The inter-cell connectors are then ready for the next step, namely the application of a compressive swaging force to provide added sealing between the cell cavities which have been inter-connected.

It is understood that the foregoing description has been made with respect to a six cell battery. However, it will be apparent to those having skill in the art to which this invention relates that the aforedescribed channel forming fixtures may be modified to form inter-cell connections between any two adjacent cells in any numbered-cell battery of two or more cells.

With respect to FIG. 5, swaging tool 220 is successively lowered over each respective inter-cell connection within the battery, such that, for example, the swaging tool jaws 222, 224 respectively engage the bus bars 223, 225 at the tapered portion thereof adjacent the partition. Swaging tool jaws 222, 224 are then closed about bus bars 223, 225 as illustrated in FIG. 5 and a hydraulic or air pressure induced force is applied to the swaging tool to both close the jaws and apply a swaging pressure of between 3000 to 5000 psi on the inter-cell connector within the partition aperture. It is also apparent to those skilled in the art that the amount of pressure necessary to achieve an expansion of the inter-cell connector within the apperture to form an adequate seal is a function of the alloy and the content thereof in the lead inasmuch as its hardness characteristics are dependent upon the alloy and the percent dilution of the lead. The above range of swaging pressure is adequate to achieve the results stated herein for those lead alloys that are presently used in battery manufacturing.

Exemplary dimensions of a partition aperture 230, the taper, and the dimensions of the cast bus bar 232 are shown in FIGS. 7A, 7B. The width D and height $d$ of the aperture are preferably 0.500 and 0.250 inches, respectively. An exemplary taper is 3°. It is apparent that for the opposing compressive forces to cause a swelling of the inter-connector within the aperture, it is necessary that the cross section of the inter-cell connector at the aperture should be less than the cross section of the cast bus bar at which point the compressive forces are applied. To achieve an additional sealing of the aperture, it is also preferable to have the bus bar overlap the upper, lower and both side portions of the aperture 230 as illustrated in FIGS. 7A and 7B. The bottom and top overlap is determined by the vertical positioning of the channels within the battery container. This is determined by the depth of the partition slots formed in the channel forming fixture previously described with respect to FIG. 3. If necessary, the amount of bottom and top overlap may be adjusted by the use of appropriate shims within the partition slots to alter the vertical positioning of the channels within the battery container. The taper of the cast bus bar provides an inclined surface for the swaging tool jaws 222, 224 to grip and engage the inter-cell connector and apply the aforementioned compressive pressure. It has been observed that the application of such pressure causes a swaging of the inter-cell connector against the opposite sides of the partition at the areas thereof where it adjoins the inter-cell connector. This will also cause a deformation of the partition and the magnitude of the deformation will also be dependent upon the partition material as well as the magnitude of the compressive pressure. It is the deformation of the bus bars against the partition that produces the deformation of the partition material in the manner described above to produce the additional sealing of the inter-cell connection. As previously mentioned, the primary sealing of the aperture is caused by the swelling of the inter-cell connector within the aperture itself such that the inner surfaces of the aperture are in tight abutment with the inner surface of the aperture. The above mentioned expansion and deformation considerably enhance the mechanical strength of the inter-cell connection and the cast bus bars whereby that structure is able to withstand vibrations which are attendant with the use of the battery, and especially for abnormally rugged use thereof.

The structure of the cast bus bar in the area adjacent the partition aperture on opposite sides thereof may also be modified to include flanges in lieu of the taper by suitable modification of the channel forming fixtures. In such an alternative formation of the inter-cell connector, flanges 230, 232, 234, and 236 are formed as illustrated in FIG. 6B. In this modification, the swaging tool jaws 222, 224, illustrated in FIG. 5, are applied at end surfaces 238, 240, 242 and 244. The respective bulk densities of flanges 230 and 232 and of flanges 234 and 236 should be greater than the bulk density of the lead alloy within aperture 246 so that the inter-cell connection will expand within aperture 246 without shearing the flanges on the cast bus bar.

FIG. 7C illustrates an end view of the cast bus bar connector, flange and plate lug taken in the direction of the arrow shown in FIG. 7B. The dimensions illustrated in FIG. 7C are only exemplary and are as follows: X = 0.125 inches; Y = 0.625 inches; Z = 0.313 inches. The flange and the inter-cell connector illustrated in dotted lines are shown before application of the compressive pressure as previously described, and represent the optimum formation of the inter-cell connector for reasons that will be more apparent from the following description.

It is of importance to consider the configuration of the inter-cell connector in view of the fact that the cross-section of the inter-cell connector determines the maximum current carrying capacity of the bus bars, the desirability of using the least amount of lead for the inter-cell connectors and the bus bars, considerations governing the formation of the inter-cell connector by flowing of the molten lead through a partition within a channel, and further in view of the undersirability of complicating the mold fixture for forming the channels. The following description assumes that the cross sectional areas of the apertures and the inter-cell connectors illustrated in FIG. 7C, 8A, and 8B are identical. FIGS. 8A and 8B illustrate additional exemplary shapes of the inter-cell connectors, apertures and bus bars, and are views taken in the same direction as is FIG. 7C. The circular-shaped aperture and inter-connector 252 of FIG. 8B is the least preferred of the three configurations inasmuch as it is impractical to use a mold fixture having a circular channel, thereby dictating the use of a square bus bar configuration 254, thereby unnecessarily wasting lead alloy. However, the inter-cell connection is well formed using the circular configuration.

Further, the square-shaped aperture and inter-cell connector 256 of FIG. 8A, which has the relative proportion as shown in FIG. 8C to the circular configuration previously discussed, wastes lead in the inter-cell connector, although extra lead alloy is not consumed for the bus bar as it has the same configuration as the inter-cell connector. However, this square-shaped configuration causes problems in forming the inter-cell connector as the lead alloy does not conform to the corner areas and assumes a "rounded" shape at the corners of the aperture.

Therefore, the preferred shape of the aperture and inter-cell connector is that shown in FIG. 7C as it represents the best comprise of the aforementioned factors, and primarily with respect to the lead alloy saved, the forming of the inter-cell connector by flowing the molten alloy through the aperture in the partition, and in causing the inter-cell connector to expand to completely fill the aperture upon application of the compressive forces. With the configuration illustrated in FIG. 7C, the ability of flowing lead alloy to conform to the shape of the aperture is optimised inasmuch as the lead alloy tends to form rounded corners as it solidifies.

In the above description, the channel forming fixture 56 of FIG. 3 was stated to be removed from the battery container for the purpose of applying compressive force to the inter-cell connectors. However, in a practical application of the processes hereindescribed in making a battery, channel forming fixture 56 (FIG. 3) would remain on the battery container for the insertion of pre-cast terminal posts (not shown) into cavities 260, 262 and that terminal post in cavity 260 is connected to plate lugs 264. In a similar manner the post connector in cavity 262 would be connected to plate lugs oppositely disposed thereto (not shown in FIG. 3). Channel forming fixture 56 is then removed from the battery container so that the step of applying pressure to the inter-cell connectors could be performed as previously described herein. Subsequent to the application of pressure, a cover or covers are sealed onto the battery container and then exterior terminal posts are connected to the pre-cast terminal post. The connection of the pre-cast terminal posts to the plate lugs, the sealing of the battery container with a cover and the interconnection of the exterior terminal posts with the pre-cast terminal post are techniques well known to those skilled in the battery making art and need not be described in any further detail for the purposes of the present invention.

We claim:

1. A method of assembling an electrical battery comprising the steps of:
   a. providing a container having at least one partition to form at least two cells therein,
   b. providing an aperture in said partition as required for inter-cell connection,
   c. placing a group of plates into each cell, each group of plates having at least one plate of positive polarity and at least one plate of negative polarity,
   d. forming a channel adjacent the plates of like polarity in each group of plates, a part of each plate of like polarity being exposed in its respective channel,
   e. flowing molten metal only in the channels with said container in an upright position to join said parts of like polarity in each cell and through the aperture in the partition to form bus bars and an inter-cell connector,
   f. applying compressive pressure to the bus bars on opposing sides of each inter-cell connector to cause an expansion of said inter-cell connector; and
   said channels each include a tapered section adjacent to said partition on opposite sides thereof and said pressure is applied to the tapered portion formed on said bus bars.

2. A method of assembling an electrical battery comprising the steps of:
   a. providing a container having at least one partition to form at least two cells therein,
   b. providing an aperture in said partition as required for inter-cell connection,
   c. placing a group of plates into each cell, each group of plates having at least one plate of positive polarity and at least one plate of negative polarity,
   d. forming a channel adjacent the plates of like polarity in each group of plates, a part of each plate of like polarity being exposed in its respective channel,
   e. flowing molten metal only in the channels with said container in an upright position to join said parts of like polarity in each cell and through the aperture in the partition to form bus bars and an inter-cell connector,
   f. applying compressive pressure to the bus bars on opposing sides of each inter-cell connector to cause an expansion of said inter-cell connector; and
   said channels each include a tapered section adjacent to said partition on opposite sides thereof and said pressure is applied to the tapered portion formed on said bus bars, said application of pressure causes deformation of said bus bars on opposite sides of said partition in the area of said aperture.

3. A method of forming inter-cell connectors within a battery, comprising the steps of:
 a. providing a container having at least one partition to form at least two cells therein,
 b. providing an aperture in said at least one partition as required for inter-cell connection,
 c. placing a group of plates into each said cell, each said group of plates having at least one plate of positive polarity and at least one plate of negative polarity,
 d. placing a channel forming fixture, including two spaced channel fixtures mounted thereon, each of said channel fixtures comprising a fixed back-dam and a movable comb, onto said container to provide a channel adjacent plates of like polarity in each of said group of plates with a part of each plate of like polarity being exposed in its respective channel,
 e. flowing molten metal in said channels to join said parts of like polarity in each cell and through said aperture in said at least one partition to form bus bars and an inter-cell connector,
 f. removing said channel forming fixture upon solidification of said metal, and
 g. applying compressive pressure to the bus bars on opposing sides of each inter-cell connector to cause an expansion of said inter-cell connector.

4. A method as in claim 3 wherein the molten metal is provided by pouring said molten metal into said channels.

5. A method as in claim 3 wherein the molten metal is provided by welding a metal lead alloy within said channels.

6. A method as in claim 3 wherein said step or removing includes the step of laterally moving the movable combs from operative relationship with the respective fixed back-dams associated therewith.

7. A method as in claim 3 further comprising the step of placing a container fixture guide onto said battery container and said channel forming fixture is vertically aligned by said container fixture guide with respect to said at least one partition to form overlapping portions of said cast bus bars above and below said aperture.

8. A method as in claim 7 further comprising the step of adjusting the vertical alignment of said channel forming fixture.

9. A method as in claim 3 wherein the movable comb and back-dam forming a channel are pre-positioned in said channel forming fixture and the placing thereof onto said container causes said part of each plate to be exposed in its respective channel.

10. A method as in claim 9 further comprising the step of chamfering the upper portions of each of said part of each plate prior to placing said group of plates into each cell.

* * * * *